United States Patent
Mandadi et al.

(10) Patent No.: US 11,614,957 B1
(45) Date of Patent: Mar. 28, 2023

(54) NATIVE-HYPERVISOR BASED ON-DEMAND CODE EXECUTION SYSTEM

(71) Applicant: Amazon Technologies, Inc., Seattle, WA (US)

(72) Inventors: Vijay Dheeraj Reddy Mandadi, Fremont, CA (US); Raviprasad V Mummidi, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 302 days.

(21) Appl. No.: 16/869,376

(22) Filed: May 7, 2020

(51) Int. Cl.
  *G06F 9/455*  (2018.01)
  *G06F 9/50*   (2006.01)

(52) U.S. Cl.
  CPC ........ *G06F 9/45558* (2013.01); *G06F 9/5077* (2013.01); *G06F 2009/45591* (2013.01); *G06F 2009/45595* (2013.01)

(58) Field of Classification Search
  CPC ............... G06F 9/45558; G06F 9/5077; G06F 2009/45591; G06F 2009/45595
  See application file for complete search history.

(56) References Cited

U.S. PATENT DOCUMENTS

| | | | | |
|---|---|---|---|---|
| 8,424,007 B1 * | 4/2013 | Hernacki | ............ | G06F 9/4881 718/103 |
| 9,043,184 B1 * | 5/2015 | Gabay | ................ | G06F 11/3034 702/183 |
| 9,442,752 B1 * | 9/2016 | Roth | .................. | G06F 9/45558 |
| 11,422,785 B2 * | 8/2022 | Manoharan | ......... | G06F 9/45558 |
| 2008/0104601 A1 * | 5/2008 | Kaneko | ................ | G06F 9/5027 718/103 |
| 2015/0227381 A1 * | 8/2015 | Botzer | ............... | H04L 41/0213 718/1 |
| 2017/0212777 A1 * | 7/2017 | Tamura | ................ | G06F 9/4881 |
| 2018/0267823 A1 * | 9/2018 | Carr | .................... | G06F 9/45558 |
| 2019/0102206 A1 * | 4/2019 | Fichtenholtz | ....... | G06F 9/44505 |

(Continued)

OTHER PUBLICATIONS

"Hypervisor" https://en.wikipedia.org/wiki/Hypervisor. Available Jan. 10, 2017. (Year: 2017).*

*Primary Examiner* — Michael W Ayers
(74) *Attorney, Agent, or Firm* — Knobbe, Martens, Olson & Bear LLP

(57) ABSTRACT

Systems and methods are provided for on-demand code execution that uses a client's host computing environment with native hypervisors. The client's host computing device receives a configuration application library. An agent process is executed on the host computing device from the configuration application library. The agent process is executed in association with a first user profile that gives the process rights to configure the client host computing device. The agent process receives, from a service external to the client host computing environment/device/native hypervisor, a code-execution request on behalf of a second user profile. The agent process provisions an execution environment on behalf of the second user profile. The execution environment runs on the native hypervisor. The code instructions are executed in the execution environment under the second user profile. The agent process monitors the code execution and receives a status regarding the execution of the code in the execution environment. The agent process further transmits the status back to the service.

21 Claims, 7 Drawing Sheets

(56) References Cited

U.S. PATENT DOCUMENTS

| | | | |
|---|---|---|---|
| 2019/0273683 A1* | 9/2019 | Jiang | H04L 61/2038 |
| 2021/0049002 A1* | 2/2021 | Myers | G06F 9/44505 |
| 2021/0294686 A1* | 9/2021 | Tsirkin | G06F 9/30098 |

* cited by examiner

NATIVE-HYPERVISOR BASED ON-DEMAND CODE EXECUTION SYSTEM

BACKGROUND

Computing devices can utilize communication networks to exchange data and distribute processing tasks. Companies and organizations operate computer networks that interconnect a number of computing devices to support operations or provide services to clients. The computing systems can be located in a single geographic location or located in multiple, distinct geographic locations (e.g., interconnected via private or public communication networks). Specifically, hosted computing environments or data processing centers, which can be referred to herein as "data centers" or "cloud computing" environments, may include a number of interconnected computing systems to provide computing resources to users of the data center. The data centers may be private data centers operated on behalf of an organization, or public data centers operated on behalf of, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, a client can request computing resources from a data center, such as single computing devices or a configuration of networked computing devices, and be provided with varying numbers of virtual machine resources. In some scenarios, a client can request that a data center provide computing resources to execute a particular task. The task may correspond to a set of computer-executable instructions, which the data center may then execute on behalf of the client. The data center may thus further facilitate increased utilization of data center resources.

BRIEF DESCRIPTION OF THE DRAWINGS

These and other features, aspects and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters can denote corresponding features throughout similar embodiments. The following is a brief description of each of the drawings.

DETAILED DESCRIPTION

Figure 1A:
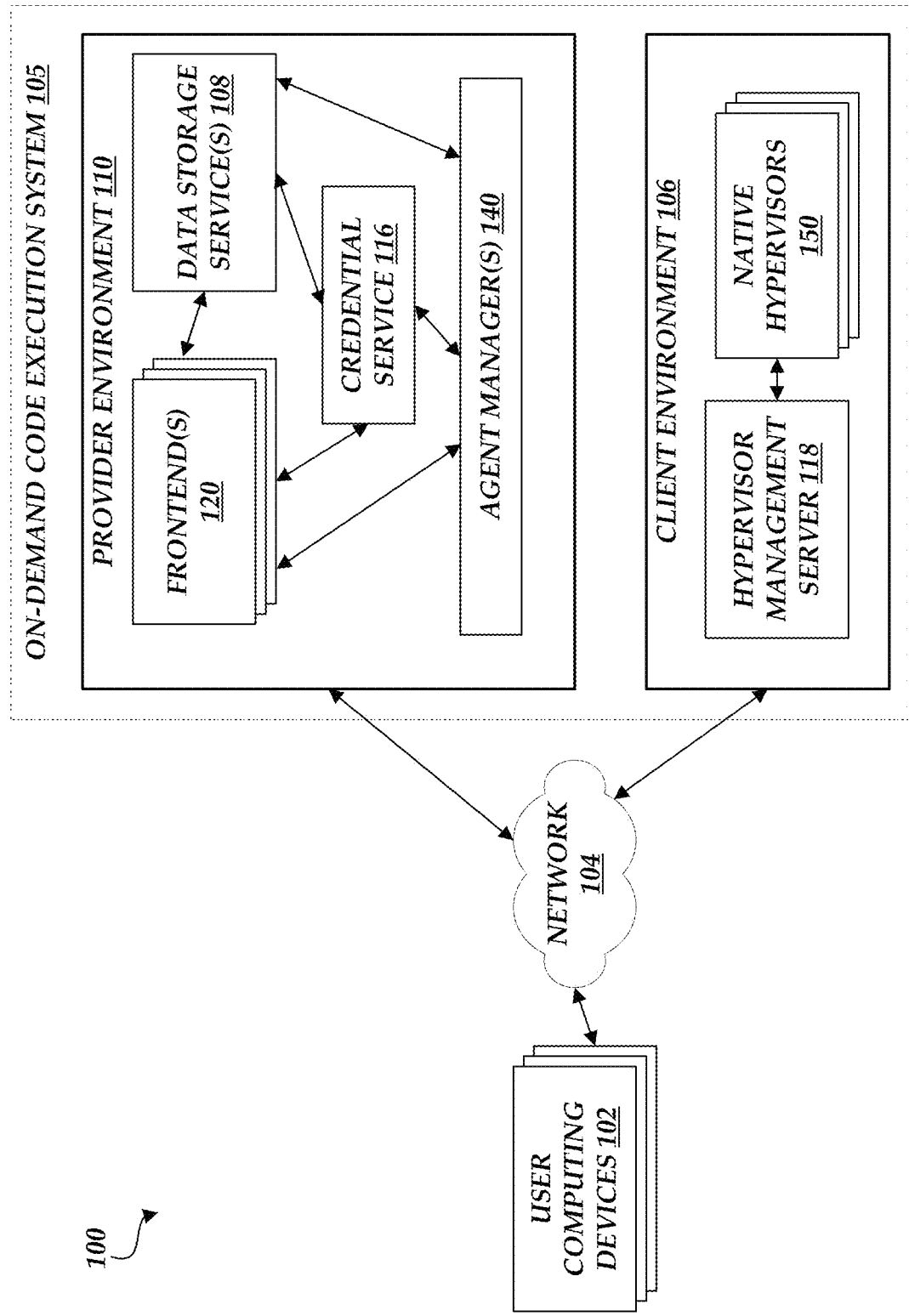
FIG. 1A is a block diagram depicting an illustrative network environment for implementing an on-demand code execution system.

As described above, a hosted computing environment can include an on-demand code execution system. An on-demand code execution system can enable rapid execution of code, which may be supplied by clients of the system. With the on-demand code execution system, the client need not create the execution environment, install an operating system, or manage a state of the environment in order to execute desired code in the environment. However, clients that need to handle events at a sub-second latency close to their applications cannot rely on using a completely external on-demand code execution system due to latency. Additionally or alternatively, client applications can use large amounts of data (e.g., hundreds of gigabytes) and it may be impractical or infeasible to move such large amounts of data to an externally hosted computing environment. Other reasons, such as compliance, regulatory, and/or privacy reasons, may prohibit or discourage a client from executing their code or applications run in an external hosted computing environment. For example, compliance reasons may prohibit a client from letting their data leave the client's own data center.

Some clients have their own host computing environments and/or devices with virtualization technology. Clients with their own host computing environments can include native-hypervisor computing devices. The term "hypervisor" (or virtual machine monitor, VMM) refers to computer software, firmware, and/or hardware that creates and runs virtual machines. The term "native hypervisor" refers to a bare-metal hypervisor that runs directly on the host's hardware as opposed to a software application that is installed on an operating system. As used herein, "native hypervisor" and "type-1 hypervisor" can be used interchangeably. An example native hypervisor is VMware ESXi™, which is a native hypervisor developed by VMware for deploying and serving virtual computers. Host computing environments, such as VMware Cloud™ or other VMware cloud computing environments, can run on ESXi hardware. Additional example native hypervisors, include but are not limited to, Microsoft's Hyper-V™ and the Kernel-based Virtual Machine (KVM), which is an open source virtualization technology built into Linux®.

Generally described, aspects of the present disclosure are directed to an on-demand code execution system that can make use of the client's host computing environments and/or devices. A client's host computing device can include a native hypervisor. The client's host computing device can receive a configuration application library. An agent process can be executed on the host computing device from the configuration application library. The agent process can be executed in association with a first user profile, such as a profile for the agent process that gives the process rights to configure the client's host computing device. The agent process can receive, from a service (such as a service external to the client's host computing environment/device/native hypervisor), a code-execution request on behalf of a second user profile. The agent process can provision an execution environment on behalf of the second user profile. The execution environment can run on the client's host computing device, such as by running on the native hypervisor. The execution environment can receive instructions to execute the code instructions under the second user profile.

The agent process can monitor the code execution and can receive a status regarding the execution of the code in the execution environment. The agent process can further transmit the status back to the service described above.

Unlike the host computing devices that are directly controlled by the provider of the on-demand code execution system, the client's host computing devices are initially controlled by the client and not the on-demand code execution system provider. The systems and methods described herein can include techniques to provision execution environments on the client's hardware. For example, an agent process can provision an execution environment and the agent process can have different access rights than the access rights of the profile authorized to execute code in the execution environment. Thus, an on-demand code execution system can efficiently make use of the client's host computing device that includes a native hypervisor.

Accordingly, an improved on-demand code execution system can make use of the client's resources to address issues associated with using some existing on-demand code execution systems. The improved on-demand code execution platform can be configured to run natively on the client's hardware. Thus, the client can use the on-demand code execution platform while also taking advantage of the benefits of using their own hardware. Example benefits can include, but are not limited to, improved latency, avoiding migrating large amounts of data, and keeping data local in accordance with compliance, regulatory, and/or privacy concerns.

As used herein, in addition to its ordinary and customary meaning, an "execution environment" can refer to a logical unit created on a host computing device that uses the resources available on that device. Based on an on-demand request to execute code, a new execution environment may be created to handle the on-demand execution of code. Each execution environment can provide a degree of isolation from other execution environments. For example, each execution environment may provide a file system isolated from other file systems on the device, and code executing in the execution environment may have limited or no access to other file systems or memory space associated with code executing outside of the execution environment. An example execution environment can be a container within a native hypervisor.

Turning to FIG. 1A, an illustrative network environment 100 is shown in which an on-demand code execution system 105 can use the client's host computing environments and/or devices, which can include native hypervisors. The network environment 100 may include user computing devices 102, a network 104, and an on-demand code execution system 105. The on-demand code execution system 105 may include a provider environment 110 and a client environment 105. The provider environment 110 can be a host computing environment of the provider of the on-demand code-execution platform. The client environment 106 can be a host computing environment of a client of the on-demand code-execution platform. The provider environment 110 may include one or more frontends 120 and one or more agent managers 140, which can be described in further detail below with respect to FIG. 1B. The client environment 106 may include a hypervisor management server 118 and one or more native hypervisors 150. The hypervisor management server 118 can typically allow an administrator to configure the one or more native hypervisors 150. The hypervisor management server 118 may include one or more custom user interfaces that allow configuration related to the on-demand execution of code in the native hypervisors 150. The constituents of the network environment 100 may be in communication with each other either locally or over the network 104. The user computing devices 102 may include any computing device capable of communicating with the on-demand code execution system 105 over the network 104. Example computing devices include a laptop or tablet computer, personal computer, personal digital assistant (PDA), hybrid PDA/mobile phone, mobile phone, and/or a smartphone. In some embodiments (while not illustrated), the user computing devices 102 can be included within the client environment 106.

While certain constituents of the network environment 100 are depicted as being in communication with one another, in some embodiments, any constituent of the network environment 100 can communicate with any other constituent of the network environment 100. For example, the user computing device 102 can communicate with the frontend 120 and/or the hypervisor management server 118 via the network 104. However, not all of these communication lines are depicted in FIG. 1A.

The client environment 106 can receive a configuration application library from the provider environment 110. A user computing device 102 can transmit a request to execute code instructions to the on-demand code execution system 105. Execution of the configuration application library on the native hypervisor 150 can cause an agent process to execute. The agent process can instantiate an execution environment on the native hypervisor 150 for processing the code instructions.

Moreover, users, by way of user computing devices 102, may interact with the on-demand code execution system 105 to provide executable code, and establish rules or logic defining when and how such code should be executed on the on-demand code execution system 105, thus establishing a "task." For example, a user may wish to run a piece of code that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution system 105, and request that the on-demand code execution system 105 execute the code. The on-demand code execution system 105 can handle the acquisition and configuration of computing capacity (e.g., execution environment, containers, instances, etc., which are described in greater detail below) based on the code execution request, and execute the code using the computing capacity. The on-demand code execution system 105 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying).

The illustrative provider environment 110 further includes one or more network-based data storage services 108, which are configured to enable the on-demand code execution system 105 to store and retrieve data from one or more persistent or substantially persistent data sources. Additionally or alternatively, the client environment 106 can include one or more network-based data storage services 108. Illustratively, the network-based data storage services 108 may enable the on-demand code execution system 105 to store information corresponding to a task, such as code or metadata, to store additional code objects representing dependencies of tasks, to retrieve data to be processed during execution of a task, and to store information (e.g., results) regarding that execution. The network-based data storage services 108 may represent, for example, a relational or non-relational database. In another example, the network-based data storage services 108 may represent a network-attached storage (NAS), configured to provide access to data arranged as a file system. The network-based data storage services 108 may further enable the on-demand code execution system 105 to query for and retrieve information regarding data stored within the on-demand code execution system 105, such as by querying for a number of relevant files or records, sizes of those files or records, file or record names, file or record creation times, etc. In some instances, the network-based data storage services 108 may provide additional functionality, such as the ability to separate data into logical groups (e.g., groups associated with individual accounts, etc.).

The network-based data storage services 108 may include a data store. As used herein, in addition to its ordinary and customary meaning, a "data store" can refer to any data structure (and/or combinations of multiple data structures) for storing and/or organizing data, including, but not limited to, relational databases (e.g., Oracle databases, MySQL databases, etc.), non-relational databases (e.g., NoSQL databases, etc.), key-value databases, in-memory databases, tables in a database, comma separated values (CSV) files, eXtendible markup language (XML) files, TeXT (TXT) files, flat files, spreadsheet files, and/or any other widely used or proprietary format for data storage.

The illustrative provider environment 110 further includes a credential service 116. An agent process of the native hypervisor 150 can request and receive a role credential from the credential service 116. The agent process can be authorized to communicate with one or more services of the provider environment 110 with the role credential. For example, the agent process can receive code-execution requests with the role credential.

The network 104 may be any wired network, wireless network, or combination thereof. In addition, the network 104 may be a personal area network, local area network, wide area network, cable network, satellite network, cellular telephone network, or combination thereof. In addition, the network 104 may be an over-the-air broadcast network (e.g., for radio or television) or a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks, such as HTTP. Protocols and components for communicating via the Internet or any of the other aforementioned types of communication networks are well known to those skilled in the art of computer communications and thus, need not be described in more detail herein.

The user computing devices 102 and the on-demand code execution system 105 may each be embodied in one or more devices. For example, the user computing devices 102 and the on-demand code execution system 105 may include a network interface, memory, hardware processor, and non-transitory computer-readable medium drive, all of which may communicate with each other by way of a communication bus. The network interface may provide connectivity over the network 104 and/or other networks or computer systems. The hardware processor may communicate to and from memory containing program instructions that the hardware processor executes in order to operate the user computing devices 102 and the on-demand code execution system 105. The memory generally includes RAM, ROM, and/or other persistent and/or auxiliary non-transitory computer-readable storage media.

Additionally, in some embodiments, the on-demand code execution system 105 and/or components thereof are implemented by one or more virtual machines implemented in a hosted computing environment. The hosted computing environment may include one or more rapidly provisioned and/or released computing resources. The computing resources may include hardware computing, networking and/or storage devices configured with specifically configured computer-executable instructions.

Figure 1B:
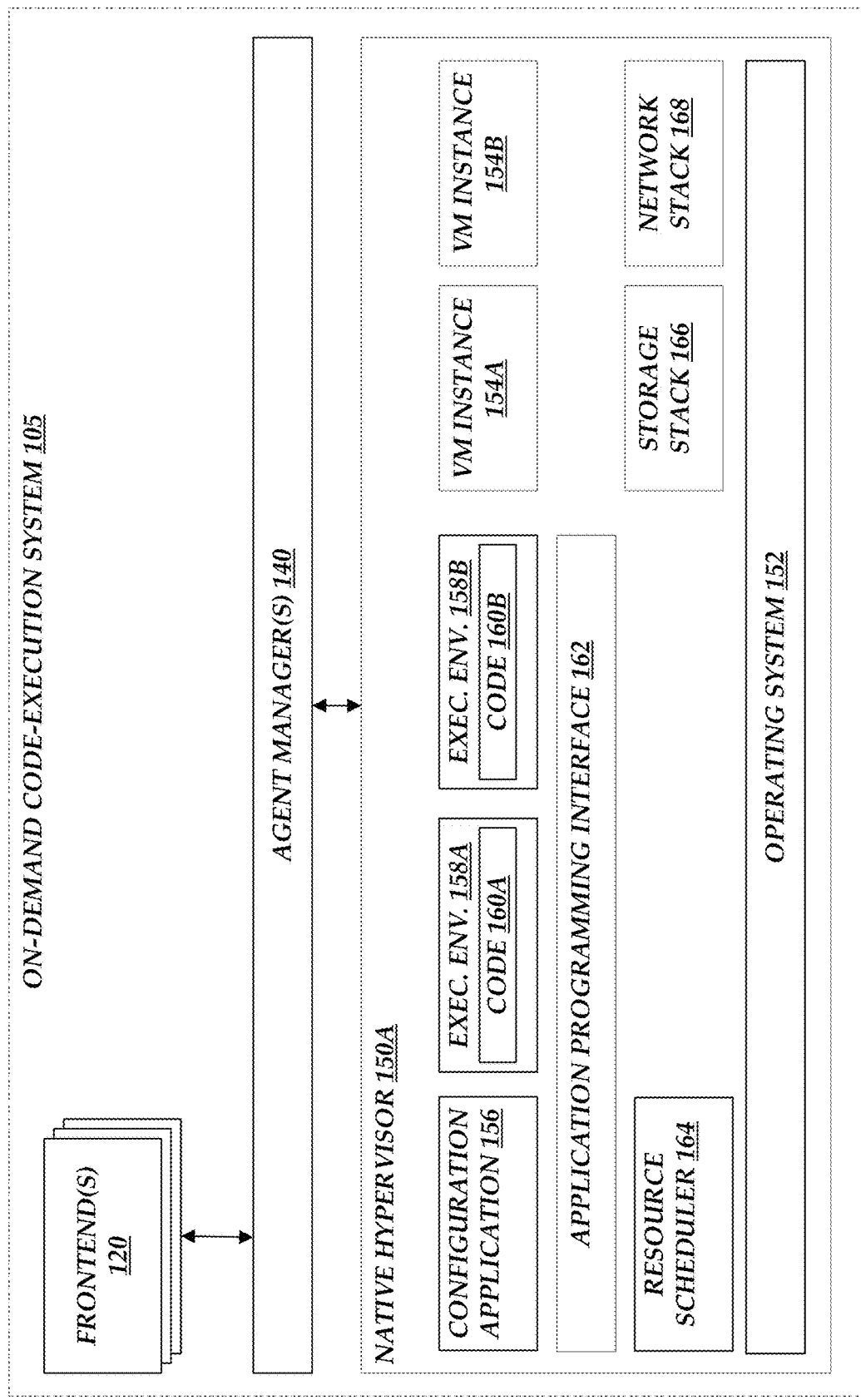
FIG. 1B is a block diagram depicting an example on-demand code execution system.

Turning to FIG. 1B, some embodiments of the on-demand code execution system 105 are depicted. The on-demand code execution system 105 could also operate within a computing environment having a fewer or greater number of devices than are illustrated in FIG. 1B, such as the environment 100 of FIG. 1A. Thus, the depiction of the on-demand code execution system 105 in FIG. 1B should be taken as illustrative and not limiting to the present disclosure.

To enable interaction with the on-demand code execution system 105, the system 110 includes one or more frontends 120, which enable interaction with the on-demand code execution system 105. In an illustrative embodiment, the frontends 120 serve as a "front door" to the other services provided by the on-demand code execution system 105, enabling users (via user computing devices 102) to provide, request execution of, and view results of computer executable code. The frontends 120 include a variety of components to enable interaction between the on-demand code execution system 105 and other computing devices. For example, each frontend 120 may include a request interface providing user computing devices 102 with the ability to upload or otherwise communication user-specified code to the on-demand code execution system 105 and to thereafter request execution of that code. In some embodiments, the request interface communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the user code specified in the request. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface.

References to user code as used herein may refer to any program code (e.g., a program, routine, subroutine, thread, etc.) written in a specific program language. In the present disclosure, the terms "code," "code instructions," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code (including, e.g., compiling code, interpreting code, or otherwise making the code executable) are referred to as "task executions" or simply "executions." Tasks may be written in programming languages, such as, but not limited to, JavaScript, Java, Python, or Ruby. Tasks may be "triggered" for execution on the on-demand code execution system 105 in a variety of manners. In embodiments, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution system 105) prior to the request being received by the on-demand code execution system 105. The code for a task may reference additional code objects maintained at the on-demand code execution system 105 by use of identifiers of those code objects, such that the code objects are combined with the code of a task in an execution environment prior to execution of the task. The on-demand code execution system 105 may vary its execution strategy for a task based on where the code of the task is available at the time a call for the task is processed.

A call to execute a task may specify one or more third-party libraries (including native libraries) to be used along with the user code corresponding to the task. In one embodiment, the call may provide to the on-demand code execution system 105 a file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution system 105 (e.g., standard routines), and/or provided by third parties. Illustratively, code not included within a call or previously uploaded by the user may be referenced within metadata of the task by use of a URI associated with the code. In some embodiments, such resource-level constraints (e.g., how much memory is to be allocated for executing a particular user code) are specified for the particular task, and may not vary over each execution of the task. In such cases, the on-demand code execution system 105 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 105 to access private resources (e.g., on a private network). In some embodiments, individual code objects may also be associated with permissions or authorizations. For example, a third party may submit a code object and designate the object as readable by only a subset of users. The on-demand code execution system 105 may include functionality to enforce these permissions or authorizations with respect to code objects.

To manage requests for code execution, the frontend 120 can include an execution queue (not shown in FIG. 1B), which can maintain a record of requested task executions. Illustratively, the number of simultaneous task executions by the on-demand code execution system 105 is limited, and as such, new task executions initiated at the on-demand code execution system 105 (e.g., via an API call, via a call from an executed or executing task, etc.) may be placed on the execution queue and processed, e.g., in a first-in-first-out order. In some embodiments, the on-demand code execution system 105 may include multiple execution queues, such as individual execution queues for each user account. For example, users of the on-demand code execution system 105 may desire to limit the rate of task executions on the on-demand code execution system 105 (e.g., for cost reasons). Thus, the on-demand code execution system 105 may utilize an account-specific execution queue to throttle the rate of simultaneous task executions by a specific user account. In some instances, the on-demand code execution system 105 may prioritize task executions, such that task executions of specific accounts or of specified priorities bypass or are prioritized within the execution queue. In other instances, the on-demand code execution system 105 may execute tasks immediately or substantially immediately after receiving a call for that task, and thus, the execution queue may be omitted.

The frontend 120 can further include an output interface (not shown in FIG. 1B) configured to output information regarding the execution of tasks on the on-demand code execution system 105. Illustratively, the output interface may transmit data regarding task executions (e.g., results of a task, errors related to the task execution, or details of the task execution, such as total time required to complete the execution, total data processed via the execution, etc.) to the user computing devices 102 or another service, which may include, for example, billing or logging services. The output interface may further enable transmission of data, such as service calls, to auxiliary services 106. For example, the output interface may be utilized during execution of a task to transmit an API request to another service (e.g., to store data generated during execution of the task).

The native hypervisor of a host computing device can include virtual machine instances 154A, 154B, a storage stack 166, a network stack 168, and an operating system 152. The storage stack 166 can be local hardware storage and/or networked storage of the native hypervisor 150A. The network stack 168 can provide the native hypervisor 150A access to the network. As described below, the configuration application 156 can instantiate the execution environments 158A, 158B via the application programming interface 162 of the native hypervisor 150A. The execution environments 158A, 158B can operate separately from the virtual machine instances 154A, 154B. In other words, the execution environments 158A, 158B may not be within the virtual machine instances 154A, 154B. The resource scheduler 164 can allow the execution environments 158A, 158B and virtual machine instances 154A, 154B to share the hardware processor(s) of the host computing device.

To execute tasks, the on-demand code execution system 105 includes one or more agent managers 140 that manage an agent process running on the native hypervisor 150A. While not shown, an agent process can be instantiated from the configuration application 156. The agent process can implement one or more execution environments 158A, 158B, which may contain and execute one or more user-submitted code instructions 160A, 160B. As described herein, execution environments can be logical units created on the native hypervisor 150A of a host computing device, using the resources available on that hypervisor. An agent manager 140 may, based on information specified in a call to execute a task, communicate with an agent process on the native hypervisor 150A. The agent process can create a new execution environment or locate an existing execution environment 158A, 158B and assign the execution environment to handle the execution of the task. The agent process can use the application programming interface 162 of the native hypervisor 150A to create the execution environment 158A, 158B. Each execution environment may correspond to an execution environment for the task, providing at least some isolation from other execution environments.

The execution environments 158A, 158B and native hypervisor 150A may further include language runtimes, code libraries, or other supporting functions (not depicted in FIG. 1B) that facilitate execution of the submitted code 160A, 160B. The virtual machine instances 154A, 154B may further include one or more operating systems. In various embodiments, the operating systems of the virtual machine instances 154A, 154B and/or the operating system 152 may be the same operating system, variants of the same operating system, different operating systems, or combinations thereof.

As described herein, an example native hypervisor 150A is ESXi. An example operating system 152 is VMkernel. An example application programming interface (API) 162 can be a user world API. As used herein, in the ESXi and/or VMkernel context, the term "user world" refers to a process running in the VMkernel operating system. The environment in which a user world runs is limited compared to what would be found in a general-purpose operating system such as Linux. Generally, a user world is not intended as a general-purpose mechanism to run arbitrary applications but provides only enough of a framework for processes that need to run in the hypervisor environment.

Once a triggering event to execute a task has been successfully processed by a frontend 120, the frontend 120 passes a request to an agent manager 140 to cause the task to be executed. In some embodiments, each frontend 120 may be associated with a corresponding agent manager 140 (e.g., an agent manager 140 co-located or geographically nearby to the frontend 120) and thus the frontend 120 may pass most or all requests to that agent manager 140. In other embodiments, a frontend 120 may include a location selector configured to determine an agent manager 140 to which to pass the execution request. In some embodiments, the location selector may determine the agent manager 140 to receive a call based on hashing the call, and distributing the call to an agent manager 140 selected based on the hashed value (e.g., via a hash ring). Various other mechanisms for distributing calls between agent managers 140 will be apparent to one of skill in the art.

In FIG. 1B, the particular configuration of the native hypervisor 150A, virtual machine instances 154A, 154B, and execution environments 158A, 15B may be used to facilitate execution of the submitted code 160A, 160B. In the illustrated example, the native hypervisor 150A implements two virtual machine instances 154A, 154B that are separate from the two execution environments 158A, 158B. The two execution environments 158A, 158B contain the submitted code 160A, 160B. It will be understood that these embodiments are illustrated for purposes of example, and that many other embodiments are within the scope of the present disclosure.

Figure 2:
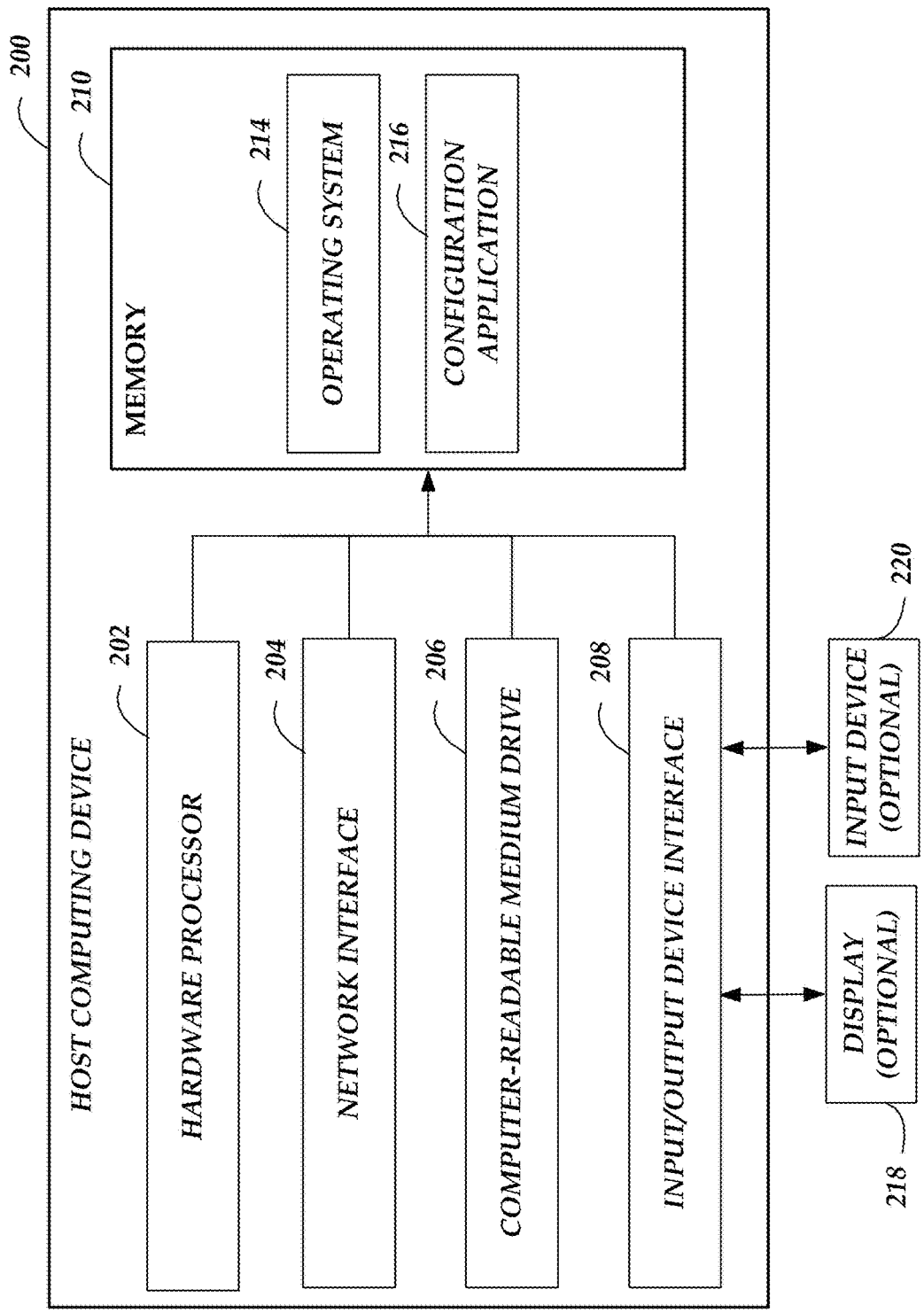
FIG. 2 depicts a general architecture of an example host computing device.

FIG. 2 is a schematic diagram of an illustrative host computing device 200 that can be used in the environment 100 in FIG. 1A. The host computing device 200 includes an arrangement of computer hardware and software components that may be used to execute code as part of an on-demand code execution system. While the general architecture of the host computing device 200 is shown and described with respect to FIG. 2, the general architecture of FIG. 2 can be used to implement other services and/or applications described herein. Those skilled in the art will appreciate that the host computing device 200 may include more (or fewer) components than those shown in FIG. 2. Further, other computing systems described herein may include similar implementation arrangements of computer hardware and software components.

The host computing device 200 may include a hardware processor 202, a network interface 204, a non-transitory computer-readable medium drive 206, and an input/output device interface 208, all of which may communicate with one another by way of a communication bus. As illustrated, the host computing device 200 is associated with, or in communication with, an optional display 218 and an optional input device 220. In other embodiments, the display 218 and input device 220 may be included in the user computing devices 102 shown in FIG. 1A. The network interface 204 may provide the host computing device 200 with connectivity to one or more networks or computing systems. The hardware processor 202 may thus receive information and instructions from other computing systems (such as the user computing devices 102) or services via the network 104. The hardware processor 202 may also communicate to and from memory 210 and further provide output information for an optional display 218 via the input/output device interface 208. The input/output device interface 208 may accept input from the optional input device 220, such as a keyboard, mouse, digital pen, touch screen, accelerometer, gyroscope, or gestures recorded via motion capture and/or image recognition (e.g., eye, hand, head, and/or body part placement and/or recognition). The input/output device interface 220 may also output audio data to speakers or headphones (not shown).

The memory 210 may contain specifically configured computer program instructions that the hardware processor 202 executes in order to implement one or more embodiments of the host computing device 200. The memory 210 generally includes RAM, ROM and/or other persistent or non-transitory computer-readable storage media. The memory 210 may store an operating system 214 that provides computer program instructions for use by the hardware processor 202 in the general administration and operation of the host computing device 200. The memory 210 may further include other information for implementing aspects of the host computing device 200.

The memory 210 may include an operating system 214 that may be executed by the hardware processor 202. In some embodiments, the configuration application 216 may implement various aspects of the present disclosure. For example, the configuration application 216 may spawn agent process(es) that instantiate the execution environments for the code execution.

Figure 3:
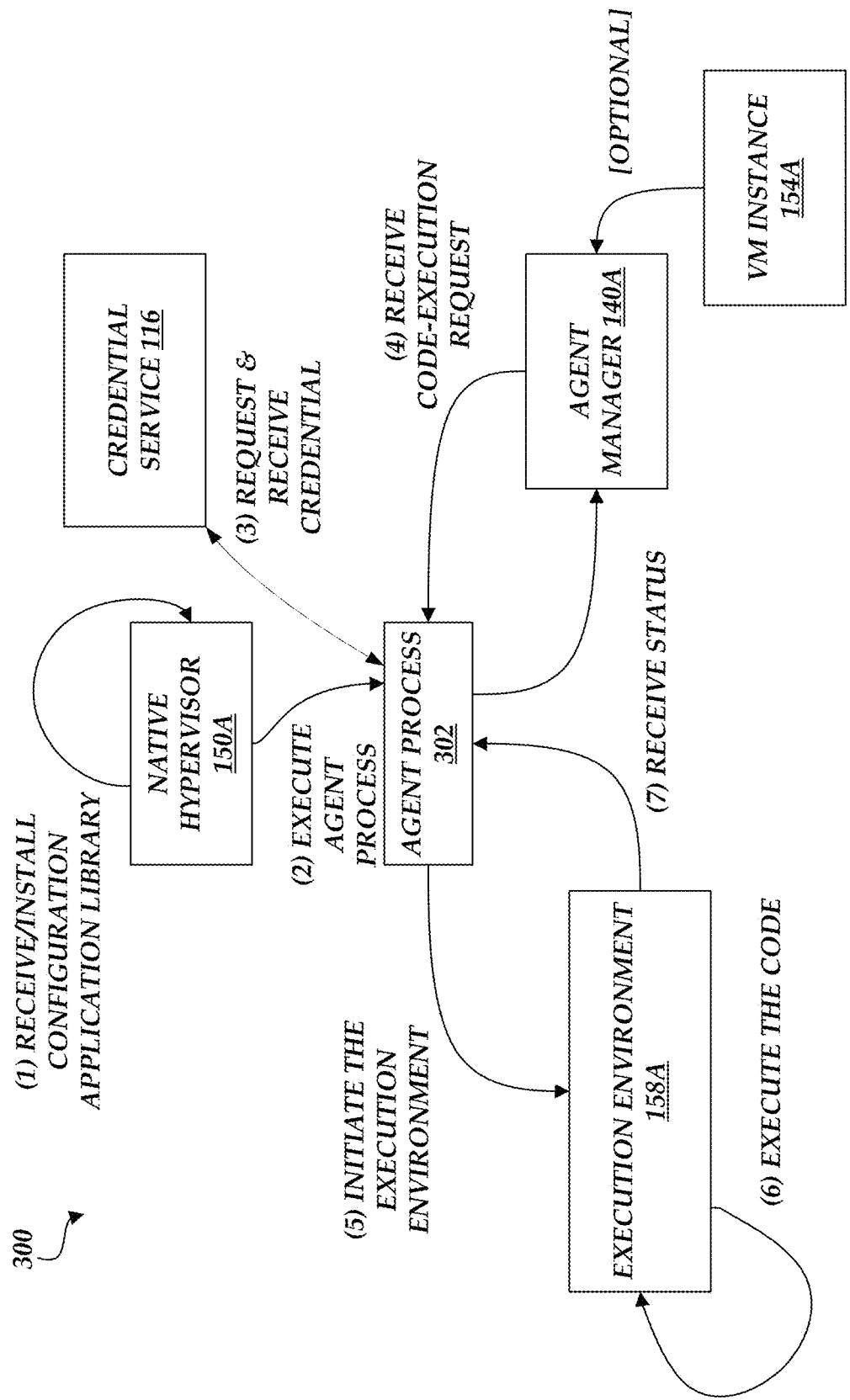
FIG. 3 is a flow diagram depicting illustrative interactions for provisioning an execution environment in a native hypervisor and executing code in the execution environment.

With reference to FIG. 3, illustrative interactions are depicted for an execution environment in a native hypervisor and executing code in the execution environment. The environment 300 of FIG. 3 can be similar to the environment 100 of FIG. 1A. The depicted interactions in FIG. 3 are example interactions. Other interactions (not illustrated) may be possible in accordance with the present disclosure in other embodiments. Similar to the communication depictions of FIG. 1A, not every possible communication may be depicted in FIG. 3.

The interactions of FIG. 3 begin at step one (1), the native hypervisor 150A can receive a configuration application library. The configuration application library can be installed on the native hypervisor 150A. In an ESXi and/or VMkernel context, the configuration application library can be in a vSphere Installation Bundle (VIB) format. When executed the configuration application library can configure the native hypervisor 150A to communicate with and incorporate features of an on-demand code execution platform.

At step two (2), an agent process 302 can be executed from the configuration application library. The agent process 302 can be the conduit through which the native hypervisor 150A integrates with the on-demand code execution platform. In an ESXi and/or VMkernel context, the agent process 302 can operate in the user world. The agent process 302 can execute under a particular user profile. The particular user profile can provide the agent process 302 with access rights in the native hypervisor 150A for actions such as creating/deleting execution environments, monitoring execution environments, and/or transmitting metadata associated with the status of the code executions in the execution environments.

At step three (3), the agent process 302 can request a role credential from the credential service 116. The credential service 116 can be a part of an identity and access management system. For example, the role credential can authorize the agent process 302 to communicate with a service on the provider environment, which can allow the agent process 302 to receive code-execution requests.

At step four (4), the agent process 302 can receive a code-execution request from the agent manager 140A. In some embodiments, the agent process 302 and the agent manager 140A can communicate via a service of the provider environment that includes the agent manager 140A. The code-execution request can contain sufficient information for the agent process 302 to initiate an execution environment on the native hypervisor 150A. As illustrated, the virtual machine instance 154A, via the agent manager 140A, can request a code execution (such as the offloading of a computation) to be executed on the native hypervisor 150A. In some embodiments, the virtual machine instance 154A does not need to communicate with the agent manager 140A. For example, in those embodiments, the virtual machine instance 154A can communicate directly with the agent process 302.

At step five (5), the agent process 302 initiates an execution environment for a user profile. The user profile for the execution environment can be different than the user profile of the agent process 302. As described herein, the execution environment can be a first-class container and/or the execution environment can be separate from a virtual machine instance of the native hypervisor 150A. The agent process 302 can further initiate the execution environment by allocating resources to the execution environment.

At step six (6), code can be executed in the execution environment 158A on-demand. The native hypervisor 150A can be configured to execute the code in the instantiated execution environment 158A. In an ESXi and/or VMkernel context, the agent process 302 can execute the code in a user world. Example code instructions can be analytics operations. For example, a vehicle can include sensors. During production or testing operation of the vehicle, the sensors can generate large amounts of data in a short period of time (such as gigabytes worth of data every second). The sensor data can be stored in host computing devices of the client, such as devices with native hypervisors. As described herein, instead of transmitting the data to external on-demand code execution system for processing, the sensor data can be processed/aggregated locally by the provisioned execution environments in the native hypervisors as described herein.

At step seven (7), the agent process 302 can receive status updates from the execution environment 158A. Examples status updates can include a completed status and/or an error status. The agent process 302 can communicate the status to the agent manager 140A, such that users of the on-demand code execution system can review the status via user interfaces of the on-demand code execution system.

Figure 4:
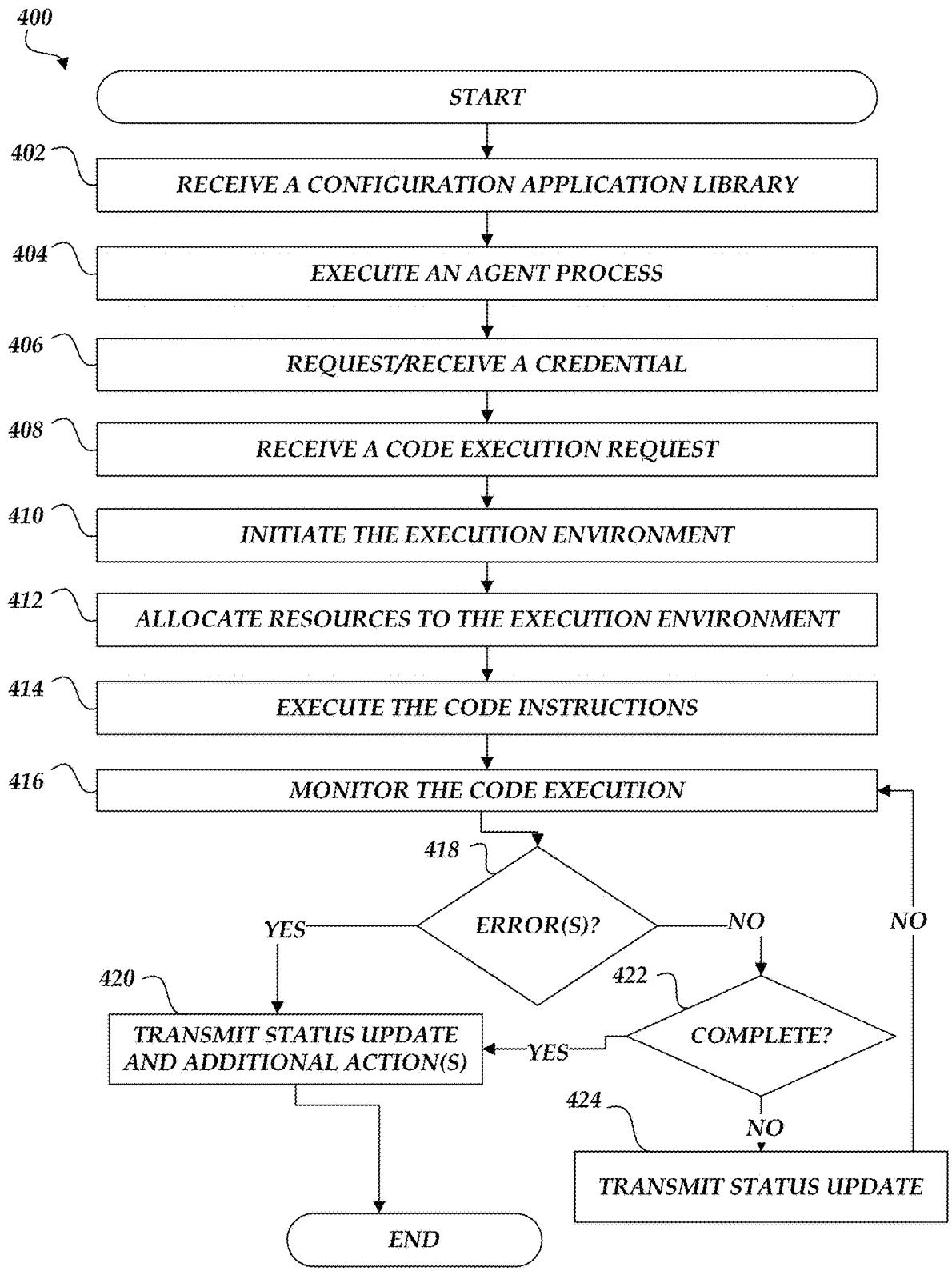
FIG. 4 is a flow chart depicting an example method for configuring native hypervisors for on-demand code execution.
Figure 5:
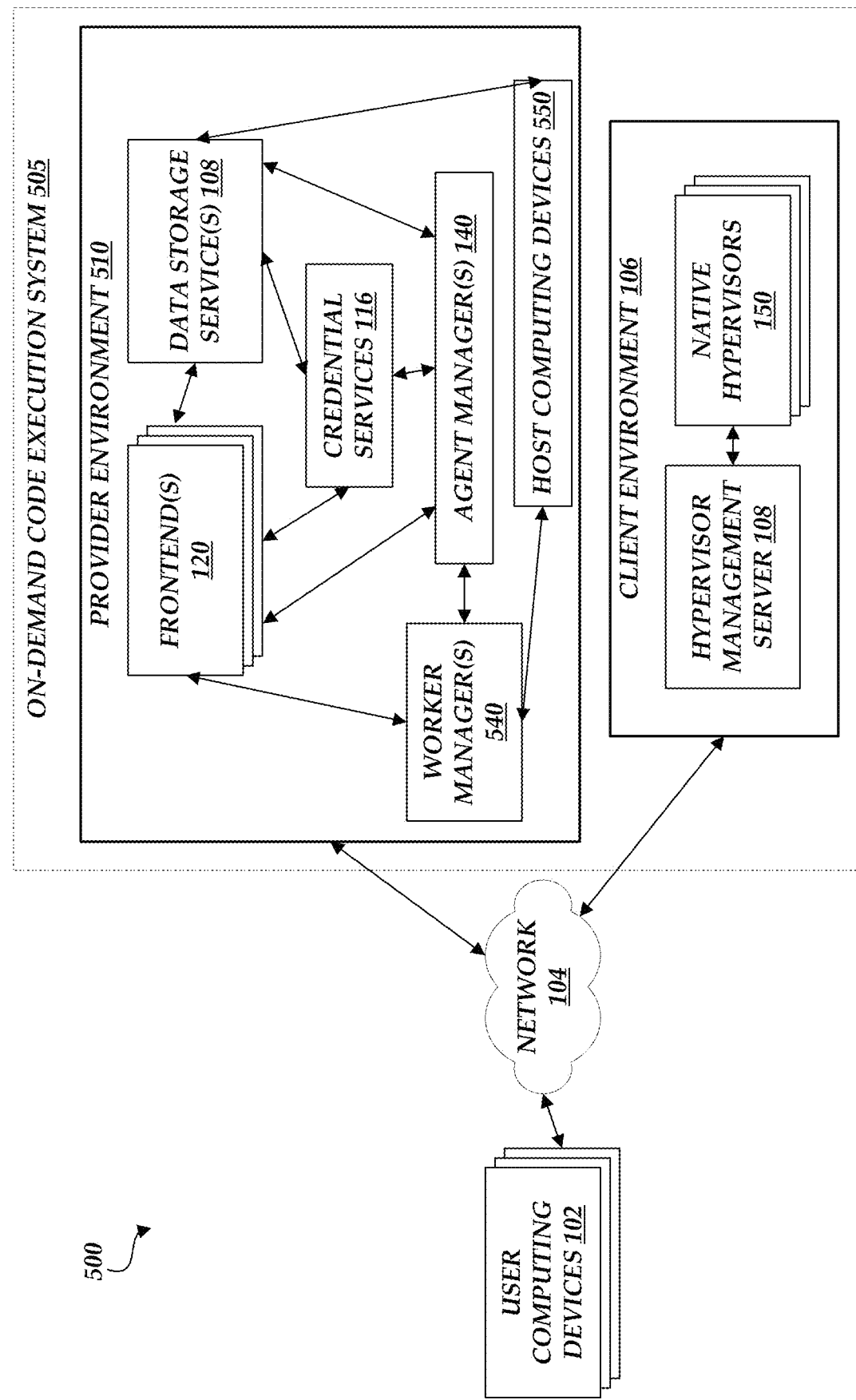
FIG. 5 is a block diagram depicting an illustrative network environment for implementing another on-demand code execution system.

FIG. 4 is a flow chart depicting an example method 400 implemented by the on-demand code execution system 105, 505 of FIGS. 1A, 1B, 5 for configuring native hypervisors for on-demand code execution. As described herein, the on-demand code execution system 105, 505 of FIGS. 1A, 1B, 5 may include various devices, services, and/or applications, some of which may implement aspects of the method 400 as described herein. Additional details regarding aspects of the method 400 are described in further detail above with respect to FIG. 3.

Beginning at block 402, a configuration application library can be received. For example, the native hypervisor 150A can receive a configuration application library. The configuration application library can be provided by the provider of the on-demand code execution platform. In some embodiments, an administrator can install the configuration application library on the native hypervisor 150A. In some embodiments, the configuration application library can be automatically installed and/or updated by the provider of the on-demand code execution platform.

At block 404, an agent process is executed. The native hypervisor 150A can execute the agent process from the configuration application library. The agent process can be responsible for core functions associated with into native hypervisors into the on-demand code execution platform, such as creating/deleting execution environments, monitoring execution environments, and/or transmitting metadata associated with the status of the execution environments. The native hypervisor 150A can execute the agent process under a user profile that is authorized to setup, delete, and monitor execution environments. As described herein, in an ESXi and/or VMkernel context, the agent process can operate in the user world.

At block 406, a credential can be requested and/or received. In particular, the agent process can request a role credential from the credential service 116. The role credential can authorize the agent process to communicate with a service of the provider environment 110. The service provider environment 110 can facilitate communication between the agent manager 140 and the agent process. The agent process can transmit the role credential to a service of the provider environment 110.

At block 408, a code-execution request can be received. In particular, the agent process can receive a code-execution request from a service external to the native hypervisor. For example, a service of the provider environment 110 can transmit code-execution requests from the agent manager 140 to a respective agent process. The code-execution request can contain sufficient information for the agent process to initiate an execution environment on the native hypervisor 150A as described herein. For example, the code execution can depend on inputs, such as code arguments or values, which can be included in the code-execution request.

At block 410, the execution environment can be initiated. In particular, the execution environment can be initiated by the agent process. The agent process can initiate the execution environment for a particular user profile that can be different than the user profile of the agent process. Thus, the agent process and the process executing the code instructions in the execution environment can have different permissions with respect to the native hypervisor 150A. As described herein, the execution environment can be a first-class container and/or the execution environment can be separate from a virtual machine instance of the native hypervisor 150A.

At block 412, resources can be allocated to the execution environment. In particular, the agent process can allocate resources to the execution environment. For example, the native hypervisor can include a resource pool. Example resources include computer hardware processor (or CPU) resources, memory resources, storage resources, and/or bandwidth resources. As part of the agent process executing, the agent process can allocate a portion of the resource pool for at least the execution of the specified code instructions in the initiated execution environment. In some embodiments, the agent process can configure the resource pool such that multiple execution environments share the same specified resource pool allocation. For example, the portion of the resource pool can be for execution of respective code instructions in each execution environment in multiple environments. In some embodiments, the portion of the resource pool can include a quantity of resource shares. For example, in an ESXi and/or VMkernel context, the agent process 302 can allocate resource shares in a manner similar to resource allocation for virtual machines. The native hypervisor can be configured to allocate usage of a resource according to the quantity of resource shares and a proportional share-based algorithm. In some embodiments, an administrator can specify the resource pool allocation via a custom user interface of the hypervisor management server 118. An administrator can, via a custom user interface of the hypervisor management server 118, configure whether a portion of the resource pool should be allocated for a particular execution environment or a group of execution environments.

At block 414, code instructions can be executed. In particular, the native hypervisor 150A can execute the code instructions for a user profile. The execution of the code instructions can include input that was provided in the code-execution request. As described herein, the user profile for executing the code instructions in the execution environment can be different than the user profile of the agent process. An advantage of natively executing code instructions in the execution environment on the native hypervisor 150A is that causing code instructions to execute can include invoking a function of an application programming interface of the native hypervisor 150A. As described herein, another advantage of executing code instructions in the execution environment on a native hypervisor is that the execution of code can be efficient because the data for the code execution may already be located in the same data center as the native hypervisor, in the same cluster of the native hypervisor, and/or on the same hypervisor.

At block 416, the code execution can be monitored. In particular, the agent process can monitor the execution of code instructions in the execution environment. Example monitoring can include the agent process polling the executing process in the execution environment for updates. Additional monitoring can include the agent process checking the amount of resources used by the execution environment during the code execution. The agent process can receive metadata from the execution environment, such as metadata generated by the process executing the code instructions in execution environment. Example metadata can include a status, such as a completed status or an error status, for the execution of the code instructions in execution environment. Additional metadata can include execution information regarding execution of the code instructions in the execution environment. Example execution information can include debug information and/or performance information, such as a performance profile. The agent process can generate data to send to the external service, such as a service of the provider environment 110, based on the received metadata. Additionally or alternatively, the agent process can send the same or similar data to the hypervisor management server 108. The frontend 120 or the hypervisor management server 108 can present user interfaces based on the metadata, such as status data, to a user regarding the execution of the code instructions.

At block 418, it can be determined whether the execution of the code instructions in the execution environment encountered any errors. In particular, the agent process can analyze the received data to determine if any errors have occurred. As described above, the receive metadata can include execution information. In the case of an error, the method 400 can proceed to block 420 for taking subsequent actions.

At block 420, in the case of an error, a status update can be transmitted and/or additional actions can be taken. In particular, the agent process can transmit an error status update and/or take additional actions. In some embodiments, additional actions can include respawning the execution environment and/o restarting the code execution. The agent process can transmit an error status update to an external service of the provider environment 110.

At block 422, in the case where an error has not been detected, it can be determined whether the execution of the code instructions in the execution environment is complete. In particular, the agent process can analyze the received data to determine if the code execution has completed. As described herein, the agent process can receive a completed status from the execution environment. The agent process can take corresponding action in response to receiving a completed status from the execution environment.

At block 420, in the case of a completed status, a status update can be transmitted and/or additional actions can be taken. In particular, the agent process can transmit a completed status update and/or take additional actions. Additional metadata may be transmitted, such as performance data regarding the completed code execution. For example, in response to receiving the completed status for the execution of the code instructions, the agent process can delete the execution environment. Alternatively, in some embodiments and cases, the execution environment can be maintained for reuse where appropriate. For example, an external service can transmit, to the agent process, a second code execution request for the same user profile as the first code execution request. The agent process can determine to reuse the execution environment for the second code execution request. The agent process can reset state in the execution environment in preparation for the second code execution request. Example state can include memory or storage associated with the first code execution request that can be reset. There may not be any security risks associated with reusing the execution environment where the user profile is the same. An administrator may have configured the execution environments for reuse where applicable and the agent process can check such a configuration for a subsequent execution request.

At block 424, in the case of an incomplete status, a status update can be transmitted. In particular, the agent process can transmit an incomplete status to the external service. Additional metadata may be transmitted, such as performance data regarding the code execution. The method 400 can return to block 416 to continue monitoring for additional status updates until the code execution completes, fails, or satisfies some other condition.

Turning to FIG. 5, an illustrative network environment 500 is shown that includes another on-demand code execution system 505. The network environment 500 of FIG. 5 can be similar to the network environment 100 of FIG. 1A. However, unlike the depiction of the on-demand code execution system 105 of FIG. 1A, the depiction of the on-demand code execution system 505 of FIG. 5 can include host computing devices 550 and worker managers 540. In the network environment 500, the client environment 106 can be configured to offload some computing tasks to the provider environment 510.

To execute tasks, the provider environment 510 includes one or more worker managers 140 that manage the instances used for servicing incoming calls to execute tasks. In the example illustrated in FIG. 5, each worker manager 140 manages an active pool of virtual machine instances, which are currently assigned to one or more users and are implemented by one or more physical host computing devices 550. The physical host computing devices 550 and the virtual machine instances may further implement one or more provider execution environments, which may contain and execute one or more submitted code instructions. The provider execution environments can be logical units created within a virtual machine instance, or on a host computing device, using the resources available on that instance or device. For example, each worker manager 540 may, based on information specified in a call to execute a task, create a new provider execution environment or locate an existing provider execution environment and assign the execution environment to handle the execution of the task. Each provider execution environment may correspond to an execution environment for the task, providing at least some isolation from other provider execution environments. For example, each provider execution environment may provide a file system isolated from other file systems on the device, and code executing in the provider execution environment may have limited or no access to other file systems or memory space associated with code executing outside of the provider execution environment.

In some embodiments, the physical host computing devices 550 of the provider environment 510 can be located on-premise at the client. For example, a provider can allow a client to purchase or rent hardware infrastructure, such as the physical host computing devices 550, that is integrated with the provider environment 510. Conversely, the native hypervisors 150 can be located off-premise. For example, the client can rent or subscribe to a service in a cloud computing environment that includes the native hypervisors 150, such as VMware Cloud.

Figure 6:
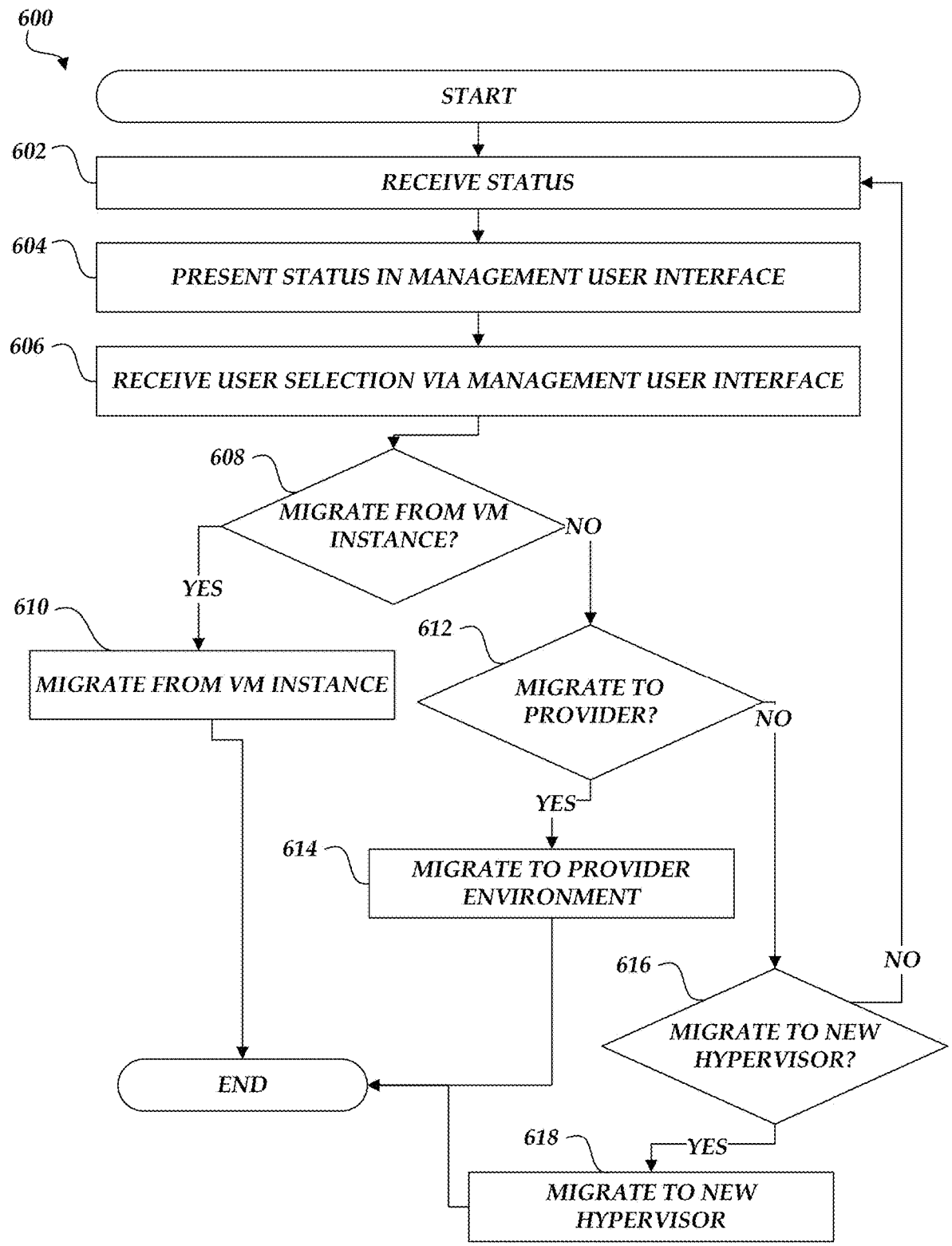
FIG. 6 is a flow chart depicting an example method for migrating on-demand code execution in the context of native hypervisors.

FIG. 6 is a flow chart depicting an example method 600 implemented by the on-demand code execution system 105, 505 of FIGS. 1A, 1B, 5 for managing on-demand code execution in an environment with native hypervisors. As described herein, the on-demand code execution system 105, 505 of FIGS. 1A, 1B, 5 may include various devices, services, and/or applications, some of which may implement aspects of the method 600 as described herein.

Beginning at block 602, a status can be received. In particular, an agent process can receive a status for a code execution in execution environment. As described herein, the agent process can transmit the status to an external service of the provider environment 110. In some embodiments, the status can be used to orchestrate code execution among various environments as described below. For example, the client environment 106 can include master and slave agent processes and/or super-agent processes and regular agent processes. An agent process can have various modes that change the method of operation of the agent process. In some embodiments, a super-agent process can control other agent processes.

At block 604, the status can be presented in a management user interface. For example, a custom user interface of the hypervisor management server 108 can present the status of a code execution to an administrator. Additional or alternatively, the frontends 120 can present the status of a code execution to an administrator. The status can indicate that a code execution failed or is delayed. The presented statuses can also indicate the statuses of virtual machine instances on the native hypervisors 150.

At block 606, a user selection can be received via the management user interface. For example, a user interface of the hypervisor management server 108 and/or the frontends 120 can present one or more options and can receive a user selection for the one or more options. In some embodiments, the user selection can indicate a selected option to offload a task (such as a computation) from a virtual machine instance. Another example option can indicate migrating a task (such as code instructions being executed) from a first execution environment to a second execution environment, which can be on a different native hypervisor. Yet another example option can indicate migrating a task (such as code instructions being executed) from a first execution environment in a native hypervisor to a host computing device 550 of the provider environment 510. Another example user selection can be a selection of a configuration option. For example, the user selection can configure load balancing and/or a distributed resource scheduler. Example configuration options can specify performance thresholds that cause tasks or processes to be migrated and/or the potential destination in the case of migrations. For example, in the case of a native hypervisor performing tasks with a lack of resources, the hypervisor management server 108 can determine to migrate the tasks based on the configuration option. Thus, the hypervisor management server 108 can automatically make determinations to migrate tasks or processes based on the specified configuration option.

At block 608, it can be determined whether a task on a virtual machine instance should be migrated to an execution environment of a native hypervisor. For example, a process can initiate a task in a virtual machine instance on a native hypervisor. Whether a task can be migrated from a virtual machine instance to an execution environment can depend on whether a corresponding option via a management user interface has been selected. Additionally or alternatively, the determination of whether to migrate a task can be based on the performance of the task in the virtual machine instance. In some embodiments, an administrator can manually trigger a task migration from a virtual machine instance to an execution environment. If it is determined that a task should be migrated from a virtual machine instance, the method 600 proceeds to block 610.

At block 610, if it is determined that the task should be migrated from a virtual machine instance, the task is migrated. For example, the task can be migrated by a process on the native hypervisor. In particular, the task can be paused or canceled. The process can transmit a message that causes an external service, such as a service of the provider environment 110, to schedule execution of the task in an execution environment of the native hypervisor. Accordingly, where some tasks in a virtual machine instance are very time consuming, such task can be offloaded to execution environments of a native hypervisor for efficiency purposes and/or can make scheduling by the native hypervisor easier.

At block 612, it can be determined whether a task/code execution in an execution environment should be migrated to a provider execution environment 510. In particular, a supervisory agent, such as a super agent, can orchestrate offloading some tasks/code executions from the native hypervisors to the host computing environment of the provider environment 510, which may include different devices than the native hypervisors. An agent can determine whether the status of the code execution is incomplete since migrating a code execution that has already completed may not make sense and/or may duplicate computing efforts. The code execution(s) can be offloaded based on the status of the execution(s) and the status of the native hypervisor(s). For example, some processing operations can be offloaded from impacted native hypervisors to the provider environment where applicable. Whether a task and/or code instructions can be migrated from a native hypervisor to the provider environment 510 can further depend on whether a corresponding option via a management user interface has been selected. In particular, an administrator could specify via a user interface to migrate a code execution from an execution environment to the provider environment 510.

At block 614, if it is determined that the task/code execution should be migrated to a provider environment, the task/code execution is migrated. In particular, an agent, such as a supervisory or super agent, can cause the migration of the task/code execution. A second agent (such as a super agent) can be executed from the configuration application library. Executing the second agent can include uploading data to the data storage service 108. The second agent can, via communication with a service of the provider environment 510, schedule second instructions to be performed on the second data in an external on-demand code execution system. As described herein, the external on-demand code execution system can use different hardware computing devices, such as computing devices 550 that do not necessarily include native hypervisors. The second agent can receive a status regarding the execution of the second code instructions in the external on-demand code execution system. Accordingly, orchestration services can load balance processing between the client environment 106 and the provider environment 510.

At block 616, it can be determined whether a task/code execution in a first execution environment should be migrated to a second execution environment. In particular, a supervisory agent, such as a super agent, can orchestrate migrating code executions from a first execution environment to a second execution environment. An agent can determine whether the status of the code execution is incomplete since migrating a code execution that has already completed may not make sense and/or may duplicate computing efforts. Based on the status of the code execution, the code execution may have stalled or failed. The code execution can be migrated based on the status of the code execution. Whether a task to execute code instructions can be migrated from a first execution environment to a second execution environment can further depend on whether a corresponding option via a management user interface has been selected. In particular, an administrator could specify via a user interface to migrate a code execution from a first execution environment to a second execution environment.

At block 618, if it is determined that the task/code execution should be migrated from a first execution environment to a second execution environment, the task/code execution is migrated. As described herein, an agent, such as a supervisory or super agent, can cause the migration of the task/code execution. As part of the migration, the execution of the code instructions in the initial execution environment can be paused. After the execution is paused, the native hypervisor can store state associated with the code execution in the initial execution environment. The stored state can be passed to and/or accessed by a new execution environment, such as a second execution environment on a second native hypervisor. In some embodiments, a second agent (such as a super agent) may instruct a first agent (such as a worker agent). For example, the second agent can cause deletion of the execution environment. Moreover, instead of the native hypervisor being configured storing state of the first execution environment, in some embodiments, the second agent can be configured to cancel the first execution and simply re-attempt the execution of the code instructions in a second execution environment. The second agent can further cause a third agent to process the task and/or code instructions in a new execution environment, which can be located in different native hypervisor than the hypervisor of the original execution environment. The third agent can be configured to instantiate a second execution environment on the second native hypervisor. Thus, the task and/or code instructions can be executed in the second execution environment on the second native hypervisor. In the case where the initial execution was paused and the second execution environment accesses the state, the execution of the code instructions in the second execution environment can constitute resuming execution of the code instructions by using the state.

If none of the previous blocks 608, 612, 616 indicate a migration, then the method 600 can return to block 602 to receive updates regarding code executions and potential future migrations.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Further, the term "each", as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer implemented method comprising:
under control of a computer hardware processor in a native hypervisor of a host computing device configured with specific computer executable instructions,
receiving a configuration application library;
executing, from the configuration application library, an agent process under a first user profile, wherein executing the agent process further comprises:
receiving, from a service external from the host computing device, a first code execution request for a second user profile; and
initiating an execution environment in the native hypervisor for the second user profile; and
causing, under the second user profile, first code instructions to execute in the execution environment, wherein the first code instructions in the execution environment comprise a first computation,
wherein causing the first code instructions to execute further comprises:
initiating, in a virtual machine instance on the native hypervisor, the first computation, and
wherein executing the agent process under the first user profile further comprises:
monitoring execution of the first code instructions in the execution environment;
receiving, from the execution environment, metadata regarding execution of the first code instructions;
pausing or cancelling the first computation on the virtual machine instance; and
transmitting a message that causes the service to schedule execution of the first computation based at least in part on the metadata.

2. The computer implemented method of claim 1, wherein the native hypervisor comprises a resource pool, and wherein executing the agent process under the first user profile further comprises:
allocating a portion of the resource pool for at least the execution of the first code instructions in the execution environment.

3. The computer implemented method of claim 2, wherein the native hypervisor further comprises a plurality of execution environments, and wherein allocating the portion of the resource pool is further for execution of respective code instructions in each execution environment in the plurality of execution environments.

4. The computer implemented method of claim 2, wherein the native hypervisor is configured to allocate usage of at least one of the computer hardware processor, memory, storage, or bandwidth according to the resource pool.

5. The computer implemented method of claim 2, wherein the portion of the resource pool further comprises a quantity of resource shares.

6. The computer implemented method of claim 5, wherein the native hypervisor is configured to allocate usage of a resource according to the quantity of resource shares and a proportional share-based algorithm.

7. A system comprising:
a data storage medium in a native hypervisor of a host computing device; and
one or more computer hardware processors, in the native hypervisor of the host computing device, in communication with the data storage medium, the one or more computer hardware processors configured to execute computer-executable instructions to at least:
  execute, from a configuration application library, an agent process under a first user profile, wherein executing the agent process further comprises:
    receiving, from a first service external from the host computing device, a first code execution request for a second user profile; and
    initiating an execution environment in the native hypervisor for the second user profile; and
  cause, under the second user profile, code instructions to execute in the execution environment,
  wherein the code instructions in the execution environment comprise a first computation,
  wherein causing the code instructions to execute further comprises:
    initiating execution of the first computation, and
  wherein executing the agent process under the first user profile further comprises:
    monitoring execution of the code instructions in the execution environment;
    receiving, from the execution environment, metadata regarding the execution of the code instructions;
    pausing or cancelling the first computation; and
    transmitting a message that causes the first service to schedule execution of the first computation based at least in part on the metadata.

8. The system of claim 7, wherein executing the agent process under the first user profile further comprises:
deleting the execution environment.

9. The system of claim 7, wherein executing the agent process under the first user profile further comprises:
receiving, from the first service, a second code execution request for the second user profile;
determining to reuse the execution environment for the second code execution request; and
resetting state in the execution environment, wherein the one or more computer hardware processors is configured to execute further computer-executable instructions to:
cause, under the second user profile, second code instructions to execute in the execution environment.

10. The system of claim 7, where the message comprises execution information regarding the execution of the code instructions in the execution environment.

11. The system of claim 7, where the message comprises a status of the execution of the code instructions in the execution environment.

12. The system of claim 7, wherein executing the agent process under the first user profile further comprises:
requesting, from a credential service, a role credential for the first service; and
transmitting the role credential to the first service, wherein transmitting the role credential to the first service causes the agent process to be authorized to communicate with the first service.

13. A system comprising:
a data storage medium in a first native hypervisor of a host computing device; and
one or more computer hardware processors, in the first native hypervisor of the host computing device, in communication with the data storage medium, the one or more computer hardware processors configured to execute computer-executable instructions to at least:
  execute, from a configuration application library, a first agent process under a first user profile, wherein executing the first agent process further comprises:
    receiving, from a first service external from the host computing device, a first code execution request for a second user profile; and
    initiating a first execution environment in the first native hypervisor for the second user profile; and
  cause, under the second user profile, first code instructions to execute in the first execution environment,
  wherein the first code instructions in the first execution environment comprise a first computation,
  wherein causing the first code instructions to execute further comprises:
    initiating, in a first virtual machine instance on the first native hypervisor, the first computation, and
  wherein executing the first agent process under the first user profile further comprises:
    receiving, from the first execution environment, metadata regarding execution of the first code instructions;
    pausing or cancelling the first computation on the first virtual machine instance; and
    transmitting, from the first virtual machine instance, a message that causes the first service to schedule execution of the first computation based at least in part on the metadata.

14. The system of claim 13, wherein the one or more computer hardware processors is further configured to execute additional computer-executable instructions to:
present, in a hypervisor management user interface, an option associated with offloading a computation from a virtual machine instance to an execution environment on a native hypervisor; and
receive, via the hypervisor management user interface, a user selection of the option.

15. The system of claim 13, wherein the one or more computer hardware processors is further configured to execute further computer-executable instructions to:
execute, from the configuration application library, a second agent process, wherein executing the second agent process further comprises:
  uploading second data to a data storage service;
  scheduling, via the first service, second code instructions to be executed on the second data in an external on-demand code execution system; and receiving, from the first service, a status regarding execution of the second code instructions in the external on-demand code execution system.

16. The system of claim 13, wherein the message indicates a status of the execution of the first code instructions in the first execution environment.

17. The system of claim 16, wherein the one or more computer hardware processors is further configured to execute further computer-executable instructions to:
execute, from the configuration application library, a second agent process, wherein executing the second agent process further comprises:
determining that the status of the execution of the first code instructions in the first execution environment is incomplete; and
determining to migrate execution of the first code instructions in the first execution environment.

18. The system of claim 17, wherein executing the second agent process further comprises:
causing deletion of the first execution environment from the first native hypervisor; and
causing a third agent process to be executed on a second native hypervisor, wherein the third agent process is configured to:
instantiate a second execution environment on the second native hypervisor, wherein the first code instructions are executed in the second execution environment on the second native hypervisor.

19. The system of claim 18, wherein executing the first agent process under the first user profile further comprises pausing the execution of the first code instructions in the first execution environment, and wherein the one or more computer hardware processors is further configured to:
store state associated with the execution of the first code instructions in the first execution environment, wherein the second execution environment accesses the state that resumes execution of the first code instructions on the second native hypervisor.

20. A system comprising:
a data storage medium in a first native hypervisor of a host computing device; and
one or more computer hardware processors, in the first native hypervisor of the host computing device, in communication with the data storage medium, the one or more computer hardware processors configured to execute computer-executable instructions to at least:
execute, from a configuration application library, a first agent process under a first user profile, wherein executing the first agent process further comprises:
receiving, from a first service external from the host computing device, a first code execution request for a second user profile; and
initiating a first execution environment in the first native hypervisor for the second user profile;
cause, under the second user profile, first code instructions to execute in the first execution environment, wherein executing the first agent process under the first user profile further comprises:
receiving, from the first execution environment, metadata regarding execution of the first code instructions; and
transmitting, based at least in part on the metadata, first data to the first service; and
execute, from the configuration application library, a second agent process, wherein executing the second agent process further comprises:
uploading second data to a data storage service;
scheduling, via the first service, second code instructions to be executed on the second data in an external on-demand code execution system; and
receiving, from the first service, a status regarding execution of the second code instructions in the external on-demand code execution system.

21. A system comprising:
a data storage medium in a first native hypervisor of a host computing device; and
one or more computer hardware processors, in the first native hypervisor of the host computing device, in communication with the data storage medium, the one or more computer hardware processors configured to execute computer-executable instructions to at least:
execute, from a configuration application library, a first agent process under a first user profile, wherein executing the first agent process further comprises:
receiving, from a first service external from the host computing device, a first code execution request for a second user profile; and
initiating a first execution environment in the first native hypervisor for the second user profile;
cause, under the second user profile, first code instructions to execute in the first execution environment, wherein executing the first agent process under the first user profile further comprises:
receiving, from the first execution environment, metadata regarding execution of the first code instructions; and
transmitting, based at least in part on the metadata, first data to the first service, wherein the first data indicates a status of the execution of the first code instructions in the first execution environment; and
execute, from the configuration application library, a second agent process, wherein executing the second agent process further comprises:
determining that the status of the execution of the first code instructions in the first execution environment is incomplete; and
determining to migrate execution of the first code instructions in the first execution environment.

* * * * *